March 18, 1958 C. W. LINCOLN ET AL 2,826,929
TRANSMISSION CONTROL
Filed Jan. 5, 1953 2 Sheets-Sheet 2
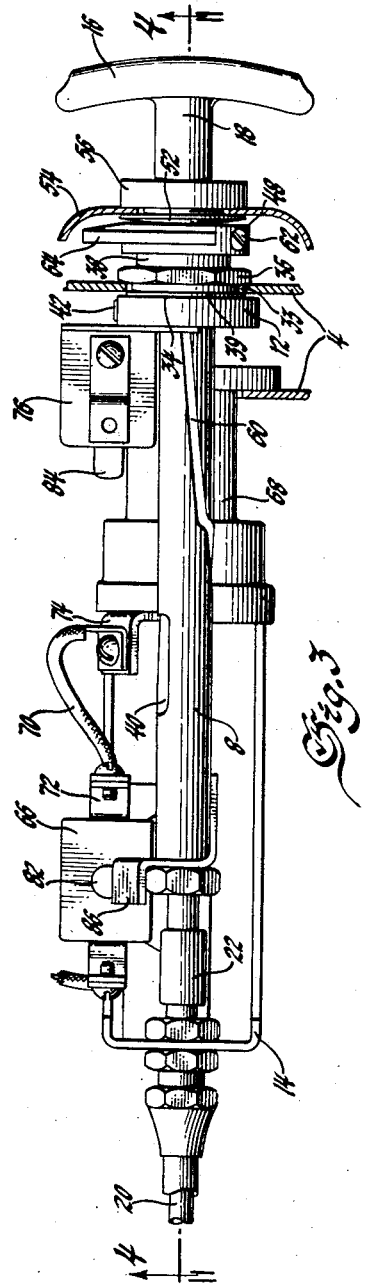
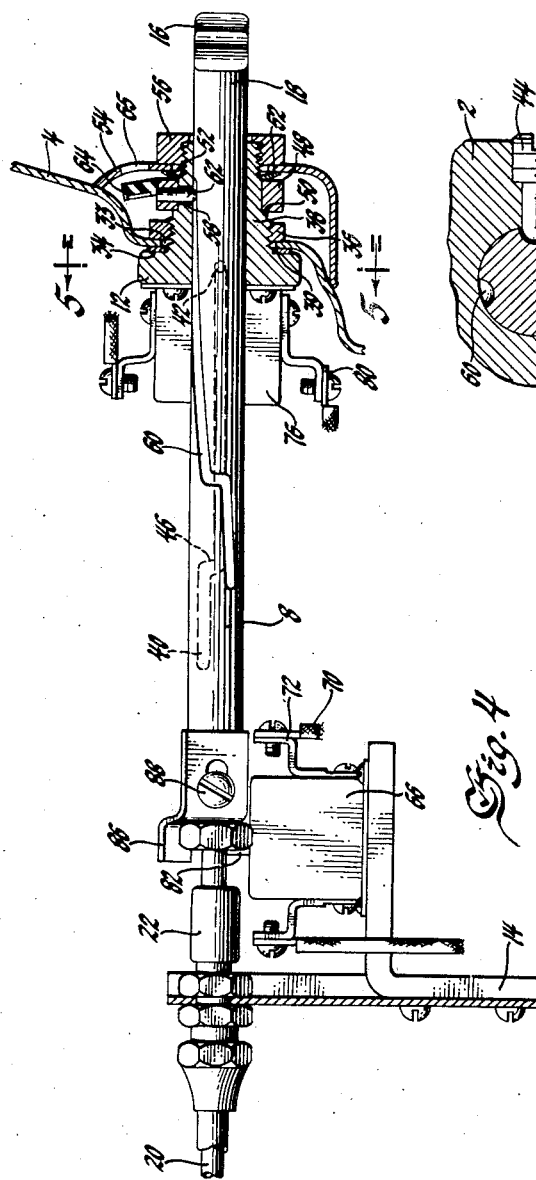
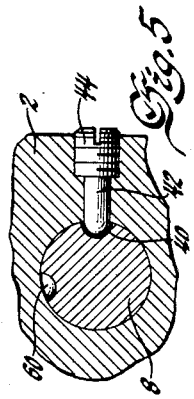
Inventor
Clovis W. Lincoln &
Philip B. Zeigler
By
Willis, Helwig & Baillio
Attorneys

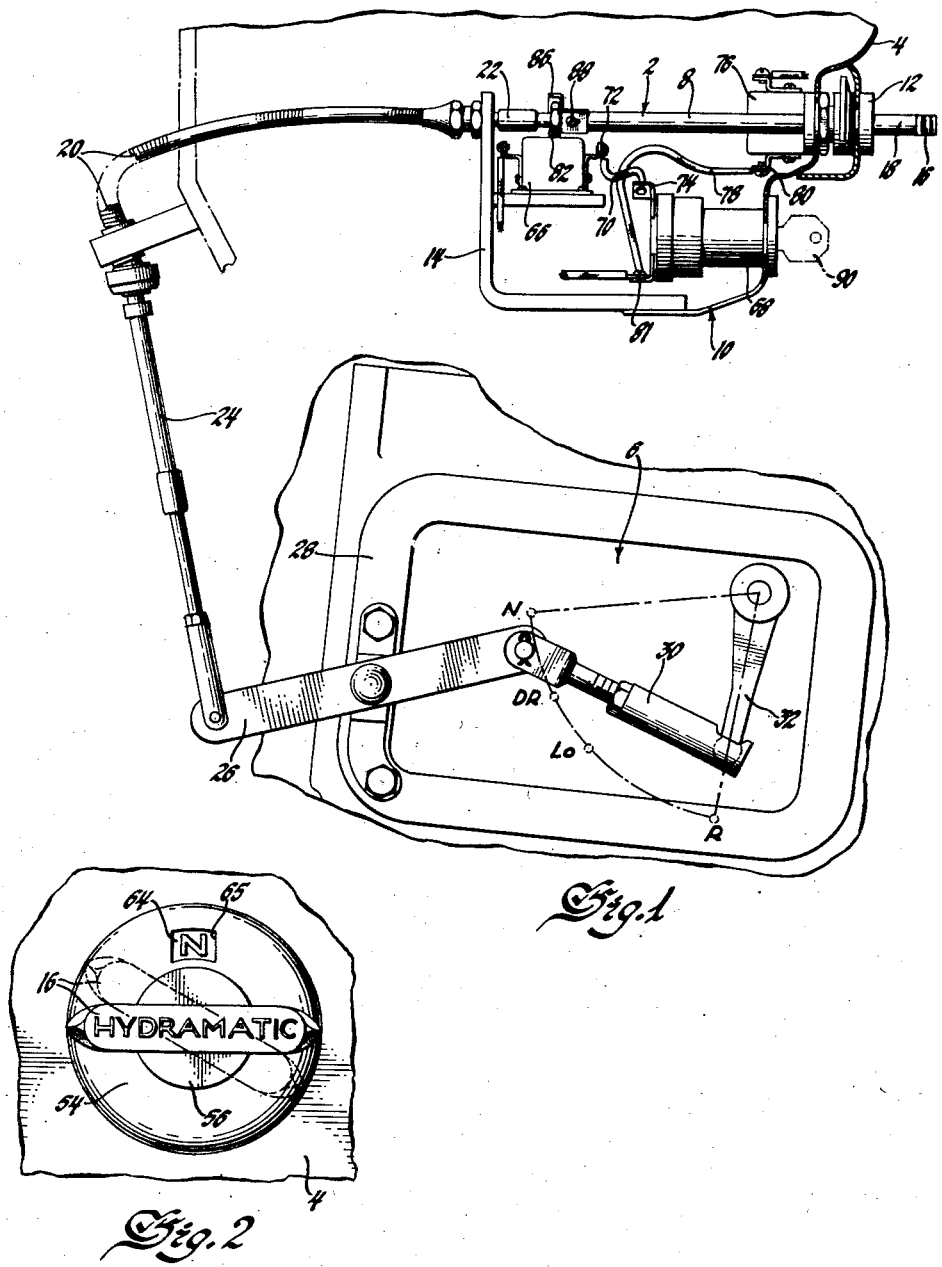

United States Patent Office 2,826,929
Patented Mar. 18, 1958

2,826,929

TRANSMISSION CONTROL

Clovis W. Lincoln and Philip B. Zeigler, Saginaw, Mich., assignors to General Motors Corporation, Detroit, Mich., a corporation of Delaware Application January 5, 1953, Serial No. 329,562

20 Claims. (Cl. 74—473)

This invention relates to devices for use in controlling the operation of automatic transmission mechanisms such as may be employed for automotive and other uses.

It is customary to provide devices for controlling the operation of standard type transmissions within easy reach of the operator due to the necessity of making frequent manual changes in the operation of such a transmission. Vehicles using the standard type transmission have had the control device mounted upon the steering column or upon the floor boards and in a position near the steering column. These positions were to assure the operator of the greatest ease of operation with the minimum of distraction and restriction. The restriction that was imposed upon the operator's freedom of movement by locating standard transmission controls near the operator was considered as secondary to the requirement that the operator be able to effect immediate changes in the transmission when necessary.

Automatic transmissions do not require the operator to actuate transmission controlling devices during the normal operation of the transmission. Such transmissions may be stopped, started, and operated at varying speeds without manual assistance. Only under unusual conditions such as the requirements of reverse movement or extreme torque will it be necessary for the operator to manually alter the performance of the automatic transmission. Because of these improvements in transmission development it is no longer necessary to place transmission controlling devices within as easy reach of the operator as has heretofore been required.

It is an object of this invention to provide a device for use in controlling the operation of automatic transmission mechanisms which need not be located as near the operator as previously required but which is still readily accessible and operable, and which will require no special knowledge on the part of the operator.

A further object of this invention is to provide a control device for such purposes that is adaptable to an instrument panel, that requires only axial and rotational movement, that is inexpensive, and that is easily assembled and installed.

A further object of this invention is to provide a control device which will indicate to the operator in a clear, simple and effective manner the condition of operation of a transmission mechanism.

A further object of this invention is to provide a device for the control of automatic transmission mechanisms which may also perform secondary and useful functions such as the operation of actuating and signal devices related to the performance of a transmission mechanism.

In the accompanying drawings:

Figure 1 is a fragmentary view of the instrument panel and transmission mechanism of a motor vehicle with a control device embracing the principles of the invention operatively associated therewith.

Figure 2 shows a suitable means by which an operator may actuate the control device of Figure 1 and also shows a transmission control position indicator.

Figure 3 is a plan view of the actuating mechanism of the control device as shown in Figure 1 embodying the principles of the invention.

Figure 4 is a partially cross-sectioned view of the proposed device as taken through the plane of line 4—4 of Figure 3 looking in the direction of the arrows.

Figure 5 is a partially cross-sectioned view of a structural feature of the proposed device as taken through the plane of line 5—5 of Figure 4 looking in the direction of the arrows.

A control device 2 embodying the principles of this invention is adapted to be secured to an instrument panel 4 of a motor vehicle having an automatic transmission mechanism 6. A rotatable and axially movable shaft 8 is mounted on a support member 10 associated with the instrument panel 4. The support member 10 comprises a support block 12 and a support bracket 14 both of which are secured to the instrument panel 4. The shaft 8 has a handle or other suitable means 16 secured to the shaft end 18 for rotatably and axially moving the shaft, and has a flexible cable 20 secured to the other end 22 of the shaft 8 which is responsive to the movement of the shaft. A connecting rod 24 is fastened to the flexible cable 20 and operates a lever 26 which is pivotally secured to the casing 28 formed about the transmission mechanism 6. The lever 26 imparts the movement which has been imposed upon the shaft 8 to the arm 30 of an actuating lever 32 secured to the transmission mechanism 6. Thus axial movement of the shaft 8 may be adapted to actuate a transmission mechanism 6 and certain positions in the axial travel of the shaft will correspond to the operational positions of "neutral," "drive," "low" and "reverse" in the transmission mechanism.

While the support member 10 of the proposed device may be secured to the instrument panel 4 by any suitable means, in the present instance a shoulder 34 is formed on the support block 12 to bear against one side of the instrumental panel 4 and a flange member 36 is adapted to be threaded onto the portion 38 of the support block 12 extending through an aperture 33 formed in the instrument panel and to bear against the other side of the instrument panel 4. The shoulder 34 and the flange member 36 thus hold the support member 10 to the instrument panel 4. A spring washer 39 positioned about the support block 12 and between the shoulder 34 and the instrument panel 4 may be used to further assure a more secure and positive fastening of the support block to the instrument panel.

A guide slot 40 is formed on the shaft 8 paralleled to the axis of the shaft and is adapted to receive a guide pin 42. The guide pin 42 may be secured to the support block 12 by screw thread or other suitable means 44. The guide pin 42 in the guide slot 40 prevents the shaft 8 from being rotated and assures only axial movement of the shaft. A circumferential offset 46 is formed in the guide slot 40 to require that the shaft 8 be rotated when the guide pin 42 engages the offset before further axial movement can be imparted to the shaft. The offset 46 is located in the guide slot 40 at a position in the line of travel of the shaft 8 which corresponds to the operational position just before the "reverse" position of the transmission mechanism 6. Thus the operator of the control device cannot inadvertently cause the transmission mechanism to be placed in the "reverse" position by axially moving the shaft 8 but must first impart a rotational movement to the shaft to be able to place it in the "reverse" position.

Since the operational position of the transmission mechanism corresponds to the axis position of the shaft 8, the degree of control of the transmission mechanism 6 will be the degree of axial movement of the shaft. The operative condition of the transmission mechanism 6 may therefore known if the axial position of the shaft 8 is known.

To provide a suitable means of indicating the axial position of the shaft 8 a rotatable collar 48 is mounted on the support block 12 and about the shaft. The collar 48 is restrained from axial movement by a shoulder 50 formed on the support block 12 and by a spring clip 52 about the support block 12 which acts against a plate member 54 and a flange member 56. The flange member 56 is threaded onto the support block 12 and bears against the plate member 54 which is adapted to ornamentally cover the portion 38 of the support block and the rotatable collar 48.

A radially extending slot 58 is formed in the support block 12 beneath the collar 48 mounted thereon and extends substantially transverse of the axis of the shaft 8 mounted therein. A cam groove 60 is formed on the shaft 8 obliquely with respect to the axis of the shaft and is adapted to receive a cam follower 62 extending through the slot 58 in the support block 12. The cam follower 62 is secured to the rotatable collar 48 on the support block 12.

As the shaft 8 is moved axially the cam follower 62 in the cam groove 60 is caused to follow the path of the cam groove. The cam follower 62 will thus move transversely with respect to the axis of the shaft 8 as the shaft is slidably moved past the cam follower due to the cam groove 60 which extends obliquely with respect to the axis of the shaft 8. The transverse movement of the cam follower 62 causes the collar 48 and a disk member 64 secured to the collar to rotate about the support block 12. Since the rotational movement of the disk 64 is dependent upon the axial movement of the shaft 8 and because the axial movement of the shaft 8 effects operational changes in the transmission mechanism 6 the disk 64 may be marked to indicate the respective conditions of the transmission mechanism 6.

An aperture 65 formed in the ornamental plate 54 fastened to the support block 12 and about the collar 48 having the disk 64 secured to it, enables the operator of the control device to see the marks on the disk 64 and thereby know the operational position of the transmission mechanism 6.

Other suitable means for indicating the operational conditions of the automatic transmission 6 such as spring loaded detents to indicate each progressive step of the transmission mechanism's operation may also be readily adapted to the proposed indicating means or may be used separately.

The control shaft 8 may also be adapted to perform secondary useful functions related to the performance of a transmission mechanism 6. In the accompanying drawings an ignition switch 66 is mounted on the support bracket 14 and is electrically connected to an ignition key switch 68 which is mounted on the instrument panel by an electrical conductor 70 attached to a terminal 72 of the ignition switch 66 and to a terminal 74 of the ignition key switch 68. A back-up signal switch 76 is mounted on the support block 12 and is connected to the ignition key switch 68 by another electrical conductor 78 which is attached to a terminal 80 of the signal switch 76 and to a terminal 81 of the ignition key switch 68. These switches 66 and 76 are adjacent and at opposite ends of the actuating shaft 8 of the proposed control device 2 and each have an actuating button 82 and 84 in close proximity to the shaft.

A switch actuating arm 86 is adapted to be secured to the shaft 8 by screw, rivet or other suitable means 88 in a position to engage the ignition switch button 82 when the shaft 8 is in the neutral position. When the ignition switch button 82 has been depressed a key 90 may be inserted in the ignition key switch 68 and rotated to cause the electrical ignition circuit on the vehicle using the proposed control device to be completed. By means of this switch arrangement it is apparent that the engine of a motor vehicle having an automatic transmission mechanism and employing the proposed device could only be started when the transmission mechanism was in the "neutral" position since only then would the electrical means of starting the engine be available.

The same general operating principles apply with regard to the back-up signal switch 76 in that only when the transmission mechanism 6 is in the "reverse" position does the actuating arm 86 on the shaft 8 engage the back-up switch control button 84 and complete the electrical circuit to the back-up signal lights on a vehicle using the proposed control device.

In a motor vehicle having an automatic transmission mechanism the proposed device may be installed on the instrument panel of the motor vehicle with the means for actuating the device projecting towards the operator and the means of operating the transmission mechanism extending rearwardly from the instrument panel to the transmission mechanism. The operator first positions the transmission mechanism by moving the control shaft until the transmission mechanism is in a neutral position. This position is indicated through an aperture in the ornamental face plate. With the control device in the neutral position the actuating arm on the shaft bears against the ignition switch control button completing the electrical circuit to the ignition key switch. The operator may now insert a key in the ignition key switch to complete the electrical circuit to the engine of a motor vehicle having the proposed device. The transmission mechanism now may be further varied by axial movement of the control shaft. Axial movement of the shaft will be translated to rotational movement of the disk member to indicate to the operator the operational positions obtained. To place the transmission mechanism in the reverse position the operator must cause the control shaft to be rotated to enable a guide pin in the support member to ride past the offset portion in the guide slot. When the control shaft has positioned the transmission mechanism in the reverse position it has also caused the actuating arm on the shaft to depress the control button on the back-up signal switch thereby completing the electrical circuit to the back-up signal lights of the motor vehicle.

What we claim is:

1. A transmission control device comprising a support member, a rotatable and axially movable shaft member mounted on said support member, means adapted to operatively connect said shaft member to the actuating mechanism of a transmission, means for rotatably and axially moving said shaft member for actuating said transmission, an indicating member mounted on said shaft member, means including a cam surface formed on one of said members obliquely with respect to the axis of said one member and a cam follower formed on one of the other of said members and cooperating with said cam surface to cause rotation of said indicating member upon axial movement of said shaft member, and means discernible upon rotation of said indicating member to indicate the operational position of said transmission.

2. A transmission control device comprising a support, an axially movable shaft member mounted on said support, means adapted to operatively connect said shaft member to the actuating mechanism of a transmission, means for axially moving said shaft member for actuating said transmission, a rotatable indicating member slidably mounted on said shaft member, means including a cam surface formed on one of said members obliquely with respect to the axis of said one member and a cam follower formed on the other of said members and cooperating with said cam surface to cause rotation of said indicating member upon axial movement of said shaft member, and means discernible upon rotation of said indicating member to indicate the operational position of said transmission.

3. A transmission control device comprising a support member, an axially movable actuating lever mounted on said support member, means adapted to operatively connect said actuating lever to the control mechanism of a transmission, means for axially moving said actuating lever for controlling said transmission, a rotatable indicating member slidably mounted on said actuating lever, means including a cam surface formed on said actuating lever obliquely with respect to the axis of said actuating lever and a cam follower formed on said disk member and cooperating with said cam surface to cause rotation of said indicating member upon axial movement of said actuating lever, and means discernible upon rotation of said indicating member to indicate the operational position of said transmission.

4. A transmission control device comprising a support member, an axially movable shaft mounted on said support member, means adapted to operatively connect said shaft to the actuating mechanism of a transmission, means for axially moving said shaft for actuating said transmission, a rotatable indicating member slidably mounted on said support member, means including a cam surface formed on one of said members obliquely with respect to the axis of said one member and a cam follower formed on the other of said members and cooperating with said cam surface to cause rotation of said indicating member upon axial movement of said shaft, and means discernible upon rotation of said indicating member to indicate the operational position of said transmission.

5. A transmission control device comprising a support member, an axially movable shaft mounted on said support member, means adapted to operatively connect said shaft to the actuating mechanism of a transmission, means for axially moving said shaft for actuating said transmission, a rotatable indicating member slidably mounted on said support member, means including a cam surface formed on said shaft member obliquely with respect to the axis of said support member and a cam follower formed on said indicating member and cooperating with said cam surface to cause rotation of said indicating member upon axial movement of said shaft, and means discernible upon rotation of said indicating member to indicate the operational position of said transmission.

6. A transmission control device comprising a first member, a rotatable and axially movable shaft member mounted on said first member, means adapted to operatively connect said shaft member to the actuating mechanism of a transmission, means for rotatably and axially moving said shaft member for actuating said transmission, means including a cam surface formed on one of said members obliquely with respect to the axis of said one member and a cam follower formed on the other of said members and cooperating with said cam surface to require relative rotation of said members during the axial movement of said shaft member, and means discernible upon axial movement of said shaft member to indicate the operational position of said transmission.

7. A transmission control device comprising support means including an indicating member, a rotatable and axially movable shaft member mounted on said support means, means adapted to operatively connect said shaft member to the actuating mechanism of a transmission, means for rotatably and axially moving said shaft member for actuating said transmission, means including a cam surface formed on said shaft member obliquely with respect to the axis of said shaft member and a cam follower formed on said indicating member and cooperating with said cam surface to require rotation of said indicating member during the axial movement of said shaft member, and means on said indicating member discernible upon rotation of said indicating member to indicate the operational position of said transmission.

8. A transmission control device comprising a support member, a rotatable and axially movable shaft member mounted on said support member, means for rotatably and axially moving said shaft member for actuating a transmission, means adapted to operatively connect said shaft to the actuating mechanism of said transmission, a rotatable disk mounted on said shaft member, means including a cam surface formed on one of said members and a cam follower formed on said disk cooperating with said cam surface to cause rotation of said disk upon axial movement of said shaft, and means discernible upon rotation of said disk to indicate the operational position of said transmission.

9. A transmission control device comprising a support member, a rotatable and axially movable shaft member mounted on said support member, means for rotating and axially moving said shaft member for actuating a transmission, means adapted to operatively connect said shaft to the actuating mechanism of said transmission, a rotatable disk mounted on said shaft member, a guide slot and a cam surface formed on one of said members, a guide pin on the other of said members and projecting into said guide slot, said guide slot being formed to provide a circumferential offset requiring rotation of said shaft member during axial movement of said shaft member, a cam follower formed on said disk and cooperating with said cam surface to cause rotation of said disk upon axial movement of said shaft, and means discernible upon rotation of said disk to indicate the operational position of said transmission.

10. A transmission control device comprising a support member, a rotatable and axially movable shaft member mounted on said support member, means for rotating and axially moving said shaft member for actuating a transmission, means adapted to operatively connect said shaft member to the actuating mechanism of said transmission, a rotatable disk slidably mounted on said shaft member, a guide slot and a cam surface formed on said shaft member, a guide pin on said support member and projecting into said guide slot, said guide slot being formed to provide a circumferential offset requiring rotation of said shaft member during axial movement of said shaft member, a cam follower formed on said disk and cooperating with said cam surface to cause rotation of said disk upon axial movement of said shaft, and means discernible upon rotation of said disk to indicate the operational position of said transmission.

11. A transmission control device comprising a support member, a rotatable and axially movable shaft member mounted on said support member, means for rotatably and axially moving said shaft member for actuating a transmission, means adapted to operatively connect said shaft member to the actuating mechanism of said transmission, a rotatable disk slidably mounted on said shaft member, means for rotatably moving said disk upon axial movement of said shaft member and means discernible upon rotation of said disk to indicate the operational position of said transmission.

12. A transmission control device comprising a support member, a rotatable and axially movable shaft member mounted on said support member, means for rotating and axially moving said shaft member for actuating a transmission, means adapted to operatively connect said shaft member to the actuating mechanism of said transmission, a rotatable disk slidably mounted on said shaft member, means for rotatably moving said disk upon axial movement of said shaft member, a guide slot formed on one of said members, a guide pin on the other of said members and projecting into said guide slot, said guide slot being formed to provide a circumferential offset requiring rotation of said shaft member during axial movement of said shaft member, and means discernible upon rotation of said disk to indicate the operational position of said transmission.

13. A transmission control device comprising a support, a rotatable and axially movable shaft member mounted on said support, means for rotating and axially moving said shaft member for actuating a transmission, means adapted to operationally connect said shaft member to the actuating mechanism of said transmission, a rotatable disk member slidably mounted on said shaft member, a cam surface formed on one of said members obliquely with respect to the axis of said one member, a cam follower formed on the other of said members and cooperating with said cam surface to cause rotation of said disk upon axial movement of said shaft, means for rotatably and axially restricting movement of said shaft member, and means discernible upon rotation of said disk to indicate the operational position of said transmission.

14. A transmission control device comprising a support member, a rotatable and axially movable shaft member mounted on said support member, means for rotating and axially moving said shaft member for actuating a transmission, means adapted to operatively connect said shaft member to the actuating mechanism of said transmission, a rotatable disk mounted on said shaft member, means for rotatably moving said disk upon axial movement of said shaft member, a guide slot formed on one of said members, a guide pin on the other of said members and projecting into said guide slot, said guide slot being formed to provide a circumferential offset requiring rotation of said shaft member during axial movement of said shaft member, a plurality of electrical switches mounted on said one member and adjacent said other member, means on said one member adapted to actuate said electrical switches during axial movement of said shaft member, and means discernible upon rotation of said disk to indicate the operational position of said transmission.

15. A transmission control device comprising a support member, a rotatable and axially movable shaft member mounted on said support member, means for rotating and axially moving said shaft member for actuating a transmission, means adapted to operatively connect said shaft to the actuating mechanism of said transmission, a guide slot formed on one of said members, a guide pin on the other of said members and projecting into said guide slot, said guide slot being formed to provide a circumferential offset requiring rotation of said shaft member during axial movement of said shaft member, a rotatable disk mounted on said shaft member, a cam surface formed on said one member, a cam follower formed on said disk and cooperating with said cam surface to cause rotation of said disk upon axial movement of said shaft member, means discernible upon rotation of said disk to indicate the operational position of said transmission, a plurality of electrical switches mounted on said one member and adjacent said other member, and means on said one member adapted to actuate said electrical switches during axial movement of said shaft member.

16. A transmission control device comprising a support member, a rotatable and axially movable shaft member mounted on said support member, means for rotatably and axially moving said shaft member for actuating a transmission, means adapted to operatively connect said shaft to the actuating mechanism of said transmission, a guide slot formed on said shaft member, a guide pin on said support member and projecting into said guide slot, said guide slot being formed to provide a circumferential offset requiring rotation of said shaft during axial movement of said shaft, a rotatable disk slidably mounted on said shaft member, a cam surface formed on said shaft member, a cam follower formed on said disk and cooperating with said cam surface to cause rotation of said disk upon axial movement of said shaft member, means discernible upon rotation of said disk to indicate the operational position of said transmission, a plurality of electrical switches mounted on said support member and adjacent said shaft member, and means on said shaft member adapted to actuate said electrical switches during axial movement of said shaft member.

17. A transmission control device comprising a support member, a rotatable and axially movable shaft member mounted on said support member, means for rotatably and axially moving said shaft member, a guide slot formed on one of said members extending generally axially of said one member, a guide pin formed on the other of said members and adapted to project into said guide slot, said guide pin being adapted to correlate the relative rotational position between said members during relative axial movement of said one member with respect to said other member, said guide slot having a first slot portion, and a second slot portion laterally offset with respect to said first portion, said first and second slot portions having adjacent terminal ends limiting axial movement of said guide pin at each terminal end of one slot portion toward the other slot portion, said guide slot having a circumferential offset slot portion connecting said terminal ends of said first and second slot portions requiring pure rotational movement of one of said members prior to continued axial movement thereof, and means for operatively connecting said shaft member to the actuating mechanism of a transmission.

18. A transmission control device comprising support means including a first member, a rotatable and axially movable shaft member mounted on said support means, means for rotatably and axially moving said shaft member, a guide slot formed on said shaft member obliquely with respect to the axis of said shaft, a guide pin formed on said first member and adapted to project into said guide slot, said guide pin being adapted to cause relative rotational movement between said members during relative axial movement of said shaft member with respect to said first member, and a circumferential offset formed on said guide slot requiring pure rotational movement of said shaft member prior to continued axial movement thereof, and means for operatively connecting said shaft member to the actuating mechanism of a transmission.

19. A transmission control device comprising a support member, an axially movable and rotatable shaft member mounted on said support member, means for operatively connecting said shaft member to the actuating mechanism of a transmission, means for axially moving and rotating said shaft member for actuating said transmission, other means for correlating said axial and rotating movement of said shaft member during the axial travel thereof, a plurality of electrical switches mounted on one of said members and adjacent the other of said members, and means on said other member adapted to actuate said electrical switches during the combined axial and rotational movement of said shaft member.

20. A transmission control device comprising a support member, a rotatable and axially movable shaft member mounted on said support member, means adapted to operatively connect said shaft member to the actuating mechanism of a transmission, means for rotatably and axially moving said shaft member for actuating said transmission, a transmission position indicating means including a member mounted on said shaft member, a cam surface formed on one of said members and a cam follower formed on the other of said members, said cam follower cooperating with said cam surface to actuate said transmission position indicating means upon axial movement of said shaft member.

References Cited in the file of this patent

UNITED STATES PATENTS

| 1,690,180 | Schmidt | Nov. 6, 1928 |
| 1,840,548 | Weatherhead | Jan. 12, 1932 |
| 2,005,483 | Sucky | June 18, 1935 |
| 2,212,442 | Kliesrath | Aug. 20, 1940 |
| 2,245,714 | Price | June 17, 1941 |
| 2,498,651 | Crom | Feb. 28, 1950 |

FOREIGN PATENTS

| 44,060 | France | July 23, 1934 |